US012737967B2

(12) United States Patent
Lee et al.

(10) Patent No.: US 12,737,967 B2
(45) Date of Patent: Sep. 15, 2026

(54) METHOD AND APPARATUS FOR REPRESENTING DYNAMIC NEURAL RADIANCE FIELDS FROM UNSYNCHRONIZED VIDEOS

(71) Applicants: Electronics and Telecommunications Research Institute, Daejeon (KR); UIF (University Industry Foundation), Yonsei University, Seoul (KR)

(72) Inventors: Ha Hyun Lee, Daejeon (KR); Gun Bang, Daejeon (KR); Soo Woong Kim, Daejeon (KR); Ji Hoon Do, Daejeon (KR); Seong Jun Bae, Daejeon (KR); Jin Ho Lee, Daejeon (KR); Jung Won Kang, Daejeon (KR); Young Jung Uh, Seoul (KR); Seo Ha Kim, Seoul (KR); Jung Min Bae, Seoul (KR); Young Sik Yun, Seoul (KR)

(73) Assignees: Electronics and Telecommunications Research Institute, Daejeon (KR); UIF (University Industry Foundation), Yonsei University, Seoul (KR)

( * ) Notice: Subject to any disclaimer, the term of this patent is extended or adjusted under 35 U.S.C. 154(b) by 99 days.

(21) Appl. No.: 18/798,982

(22) Filed: Aug. 9, 2024

(65) Prior Publication Data

US 2025/0054224 A1 Feb. 13, 2025

(30) Foreign Application Priority Data

Aug. 10, 2023 (KR) ........................ 10-2023-0105173
Aug. 2, 2024 (KR) ........................ 10-2024-0103437

(51) Int. Cl.
*G06T 15/20* (2011.01)
*G06T 7/20* (2017.01)
(Continued)

(52) U.S. Cl.
CPC ................ *G06T 15/20* (2013.01); *G06T 7/20* (2013.01); *G06T 7/70* (2017.01); *G06T 9/002* (2013.01);
(Continued)

(58) Field of Classification Search
CPC .................. G06T 15/205; G06T 15/20; G06T 2207/20084; G06T 15/08;
(Continued)

(56) References Cited

U.S. PATENT DOCUMENTS 11,288,857 B2 3/2022 Meshry et al.
2016/0286198 A1 9/2016 Ban
(Continued)

FOREIGN PATENT DOCUMENTS

WO 2023/086398 A1 5/2023

OTHER PUBLICATIONS

Fridovich-Keil, Sara, et al. "K-Planes: Explicit Radiance Fields in Space, Time, and Appearance." arXiv preprint arXiv:2301. 10241 (Mar. 2023) (Year: 2023).*
(Continued)

*Primary Examiner* — Xiao M Wu
*Assistant Examiner* — Scott E Sonners
(74) *Attorney, Agent, or Firm* — Sughrue Mion, PLLC

(57) ABSTRACT

The present disclosure relates to a method and apparatus for representing dynamic neural radiance fields from unsynchronized videos. A method of acquiring a video at an arbitrary viewpoint based on a dynamic neural radiance fields model according to an embodiment of the present disclosure may comprise: inputting one or more videos acquired from one or more views for one scene into the dynamic neural radiance fields model; inputting a time embedding for the one or more videos into the dynamic neural radiance fields model; and rendering the video at the
(Continued)

arbitrary viewpoint based on color information and density information output by the dynamic neural radiance fields model. Herein, time synchronization related to the time embedding may be performed by applying an individual time offset learned for each view, for the one or more views.

20 Claims, 10 Drawing Sheets

(51) Int. Cl.

| | |
|---|---|
| ***G06T 7/70*** | (2017.01) |
| ***G06T 9/00*** | (2006.01) |
| ***G06T 15/08*** | (2011.01) |
| ***G06T 17/00*** | (2006.01) |
| ***H04N 5/05*** | (2006.01) |
| *G06T 3/4046* | (2024.01) |
| *G06T 15/06* | (2011.01) |

(52) U.S. Cl.
CPC ............ *G06T 15/08* (2013.01); *G06T 15/205* (2013.01); *G06T 17/00* (2013.01); *H04N 5/05* (2013.01); *G06T 3/4046* (2013.01); *G06T 15/06* (2013.01); *G06T 2207/10016* (2013.01); *G06T 2207/20081* (2013.01); *G06T 2207/20084* (2013.01)

(58) Field of Classification Search
CPC ........... G06T 2207/20081; G06T 17/00; G06T 13/00; G06T 2207/10016; G06T 7/97; G06T 13/40; G06T 15/06; G06T 15/506; G06T 2207/30244; G06T 7/174; G06T 7/70; G06T 7/80; G06T 7/75; G06T 7/90; G06N 3/045; G06N 3/08; G06N 3/09; G06N 3/048; G06N 3/0464; G06N 3/0475; G06N 20/00; G06N 3/0455; G06V 10/46; G06V 10/82; G06V 10/87; G06V 20/64; G06V 2201/12; H04N 13/117; H04N 13/296
See application file for complete search history.

(56) References Cited

U.S. PATENT DOCUMENTS

| | | | | |
|---|---|---|---|---|
| 2017/0053456 | A1 | 2/2017 | Cho et al. | |
| 2022/0237834 | A1 | 7/2022 | Duckworth et al. | |
| 2022/0239844 | A1 * | 7/2022 | Lv | G06T 15/205 |

OTHER PUBLICATIONS

Shuai Q, Geng C, Fang Q, Peng S, Shen W, Zhou X, Bao H. Novel view synthesis of human interactions from sparse multi-view videos. InACM SIGGRAPH 2022 conference proceedings Jul. 2, 20227 (pp. 1-10). (Year: 2022).*

Liao Y, Di Y, Zhou H, Zhu K, Lu M, Duan Q, Liu J. A survey on neural radiance fields. ACM Computing Surveys. Sep. 9, 2025;58(2): 1-33. (Year: 2025).*

Xiao W, Chierchia R, Cruz RS, Li X, Ahmedt-Aristizabal D, Salvado O, Fookes C, Lebrat L. Neural radiance fields for the real world: A survey. arXiv preprint arXiv:2501.13104. Jan. 22, 2025. (Year: 2025).*

* cited by examiner

FIG.2
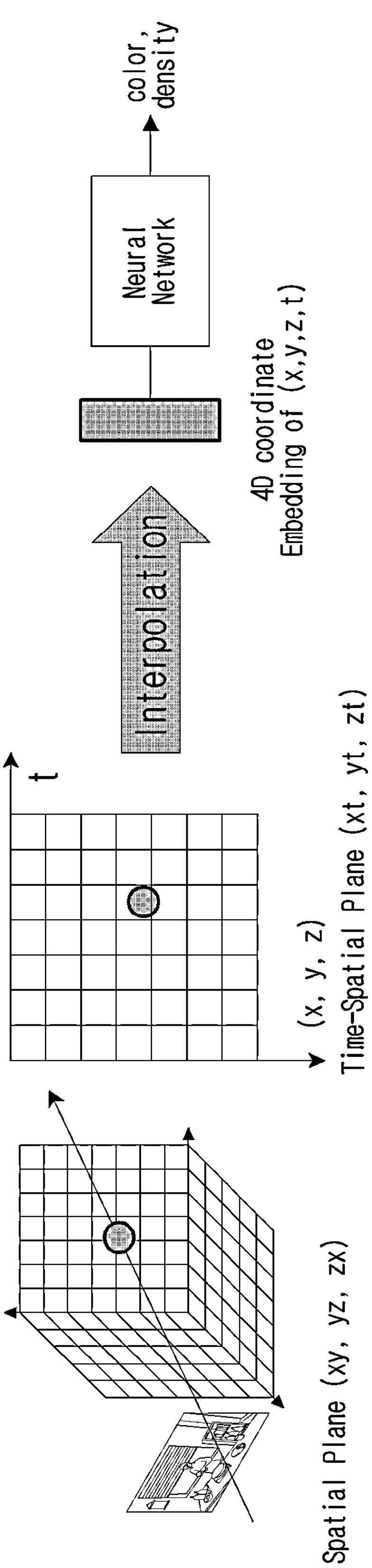

METHOD AND APPARATUS FOR REPRESENTING DYNAMIC NEURAL RADIANCE FIELDS FROM UNSYNCHRONIZED VIDEOS

CROSS-REFERENCE TO RELATED APPLICATIONS

This application claims the benefit of earlier filing date and right of priority to Korean Application No. 10-2023-0105173, filed on Aug. 10, 2023 and Korean Application No. 10-2024-0103437, filed on Aug. 2, 2024, the contents of which are all hereby incorporated by reference herein in their entirety.

TECHNICAL FIELD

The present disclosure relates to dynamic neural radiance fields model technology.

BACKGROUND

The neural radiance fields model learns volumetric density and color in three-dimensional space from multi-view images, and it is a promising digital content technology that combines with 2D perspective projection technology to obtain images taken from arbitrary viewpoints.

Recently, by utilizing a generalized neural radiance fields model that can process both 3D static scenes and 4D dynamic scenes including time using the same principle, such as K-Planes, A dynamic neural radiance fields model that quickly learns 4D images using grid embedding representations, such as MixVoxels, and deformation function and 3D Gaussian splatting, such as 4DGS (4D Gaussian splatting), technology for rapidly learning and real-time rendering of 4D images is being actively developed.

SUMMARY

The technical object of the present disclosure is to provide a method and device for synchronizing time while learning the neural radiance fields without separate preprocessing for time synchronization.

The technical objects to be achieved by the present disclosure are not limited to the above-described technical objects, and other technical objects which are not described herein will be clearly understood by those skilled in the pertinent art from the following description.

A method of acquiring a video(/image) at an arbitrary view based on a dynamic neural radiance fields model according to an aspect of the present disclosure may comprise: inputting one or more videos acquired from one or more views for one scene into the dynamic neural radiance fields model; inputting a time embedding for the one or more videos into the dynamic neural radiance fields model; and rendering the video at the arbitrary view based on color information and density information output by the dynamic neural radiance fields model. Herein, time synchronization related to the time embedding may be performed by applying an individual time offset learned for each view, for the one or more views.

An apparatus of acquiring a video at an arbitrary view based on a dynamic neural radiance fields model according to an additional aspect of the present disclosure may comprise at least one processor and at least one memory, and the processor may be configured to: input one or more videos acquired from one or more views for one scene into the dynamic neural radiance fields model; input a time embedding for the one or more videos into the dynamic neural radiance fields model; and render the video at the arbitrary view based on color information and density information output by the dynamic neural radiance fields model. Herein, time synchronization related to the time embedding may be performed by applying an individual time offset learned for each view, for the one or more views.

As one or more non-transitory computer readable medium storing one or more instructions according to an additional aspect of the present disclosure, the one or more instructions may be executed by one or more processors and control an apparatus for acquiring a video at an arbitrary view based on a dynamic neural radiance fields model to: input one or more videos acquired from one or more views for one scene into the dynamic neural radiance fields model; input a time embedding for the one or more videos into the dynamic neural radiance fields model; and render the video at the arbitrary view based on color information and density information output by the dynamic neural radiance fields model. Herein, time synchronization related to the time embedding may be performed by applying an individual time offset learned for each view, for the one or more views.

In various aspects of the present disclosure, the time offset may correspond to a learnable parameter. In this regard, the time offset may be repeatedly learned to reduce an error between the rendered image obtained through learning and the ground-truth image.

Additionally, in various aspects of the present disclosure, the time offset may be applied based on a time of the reference video for the one scene.

Additionally, in various aspects of the present disclosure, in a case that the dynamic neural radiance fields model is a model with embeddings at discrete times, the time corrected using the time offset may be used as the input to the spatial-time plane, for the time embedding. In this regard, the time plane may be normalized to $[-a, a]$ for the above dynamic neural radiance fields model, and a may be a value greater than 0 and less than 1.

Additionally, in various aspects of the present disclosure, in a case that the dynamic neural radiance fields model is a model with embeddings for each continuous time, the dynamic neural radiance fields model may further include a specific neural network that outputs a corrected time embedding based on the time offset. In this regard, the specific neural network may include a fully connected neural network based on two layers.

Additionally, in various aspects of the present disclosure, each of the one or more videos may correspond to a 3-dimensional video based on 3-dimensional coordinates.

According to the present disclosure, a method and device for synchronizing time while learning a neural radiance fields may be provided without separate preprocessing for time synchronization.

The dynamic neural radiance fields model using existing multi-view videos has poor performance when the times of the videos are not synchronized, but, according to the present disclosure, there is a technical effect of automatically correcting the time of a video that is not synchronized through time offset and ensuring the performance of a dynamic neural radiance fields.

Effects achievable by the present disclosure are not limited to the above-described effects, and other effects which are not described herein may be clearly understood by those skilled in the pertinent art from the following description.

BRIEF DESCRIPTION OF THE DRAWINGS

FIG. 2 illustrates operation based on the K-Planes model that may be applied to this disclosure.

DETAILED DESCRIPTION

Figure 1:
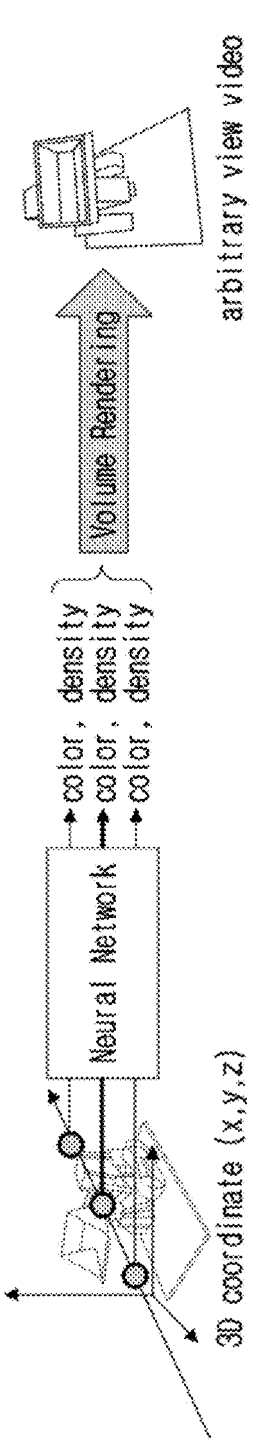
FIG. 1 illustrates a neural radiance fields model-based operation that may be applied to the present disclosure.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

In relation to the dynamic neural radiance fields model proposed in the present disclosure, the neural radiance fields model, K-Planes model, MixVoxels model, and 4DGS model are described.

The neural radiance fields model is a digital content technology that learns a neural network that represents a scene from images taken from multi-view and renders it from an arbitrary viewpoint.

FIG. 1 illustrates a neural radiance fields model-based operation that may be applied to the present disclosure.

Referring to FIG. 1, the neural radiance fields model can learn volumetric density and color for 3-dimensional space. Thereafter, an image at an arbitrary viewpoint may be expressed by applying volume rendering technology to the output (e.g., volume density and color) of the neural radiance fields model.

The neural radiance fields model may be learned while reducing the error between the rendered image obtained through learning and the ground-truth image.

In addition, the dynamic neural radiance fields model technology corresponds to a technology that may acquire video(/image) at an arbitrary viewpoint by expanding the neural radiance fields model to a 4-dimensional area including the time axis.

Regarding the expansion to the 4-dimensional domain for the dynamic neural radiance fields model technology described above, the K-Planes model may be utilized.

K-Planes corresponds to a model that represents the space represented by the neural radiance fields model as a combination of several 2-dimensional grid embedding planes.

FIG. 2 illustrates operation based on the K-Planes model that may be applied to this disclosure.

Referring to FIG. 2, for the 3-dimensional space plane (xy, yz, zx), embedding of 4-dimensional coordinates (x, y, z, t) may be performed by performing interpolation by adding a spatial-time plane (xt, yt, zt) considering the time domain. By inputting this into a neural network, information on density and color in a 4-dimensional area may be output/obtained.

In other words, the 3-dimensional static neural radiance fields may be expanded into a 4-dimensional dynamic neural radiance fields by increasing the number of 2-dimensional planes.

Additionally, in relation to the dynamic neural radiance fields model technology described above, the MixVoxels model may be considered.

The MixVoxels model corresponds to a dynamic neural radiance fields model that quickly learns 4-dimensional video by utilizing grid embedding representation.

Figure 3:
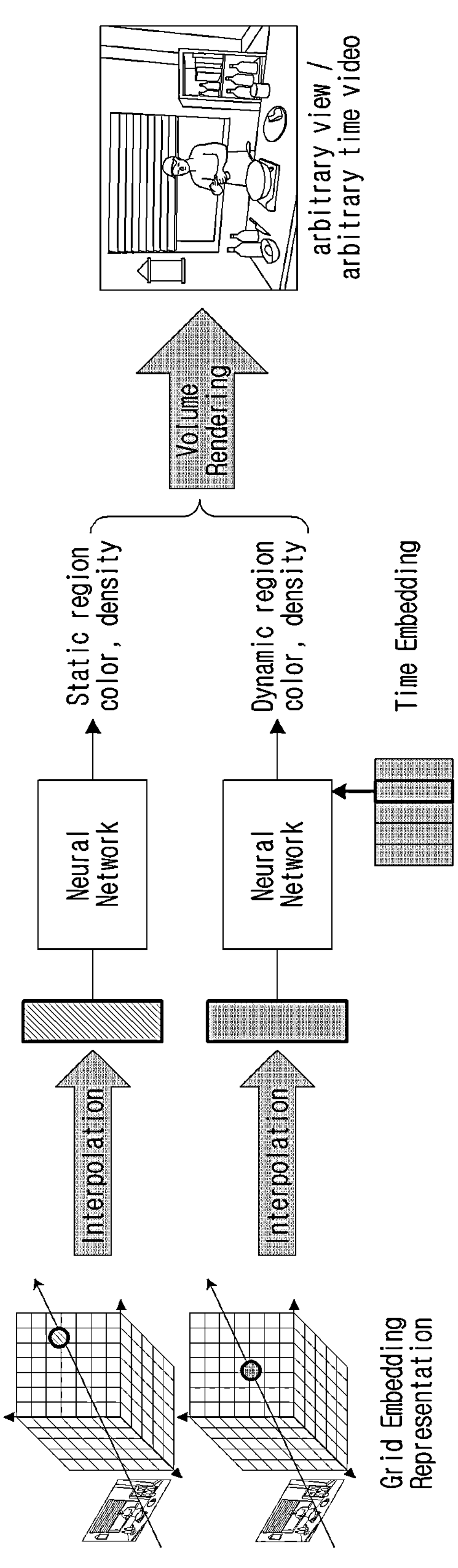
FIG. 3 illustrates a MixVoxels model-based operation that may be applied to this disclosure.

FIG. 3 illustrates a MixVoxels model-based operation that may be applied to this disclosure.

Referring to FIG. 3, the MixVoxels model may be based on a method of modeling the dynamic region and the static region independently and then performing perspective projection by mixing the results for the two regions.

At this time, in the operation of calculating the color and density of the dynamic region, time embedding may be additionally input to the neural network.

Additionally, when extending the above-described dynamic neural radiance fields model technology to dynamic Gaussian splatting, a 4D Gaussian splatting (4DGS) model may be considered.

The 4DGS model corresponds to a dynamic neural radiance fields model quickly learns and renders 4-dimensional video using 3-dimensional Gaussian splatting and deformation functions.

Figure 4:
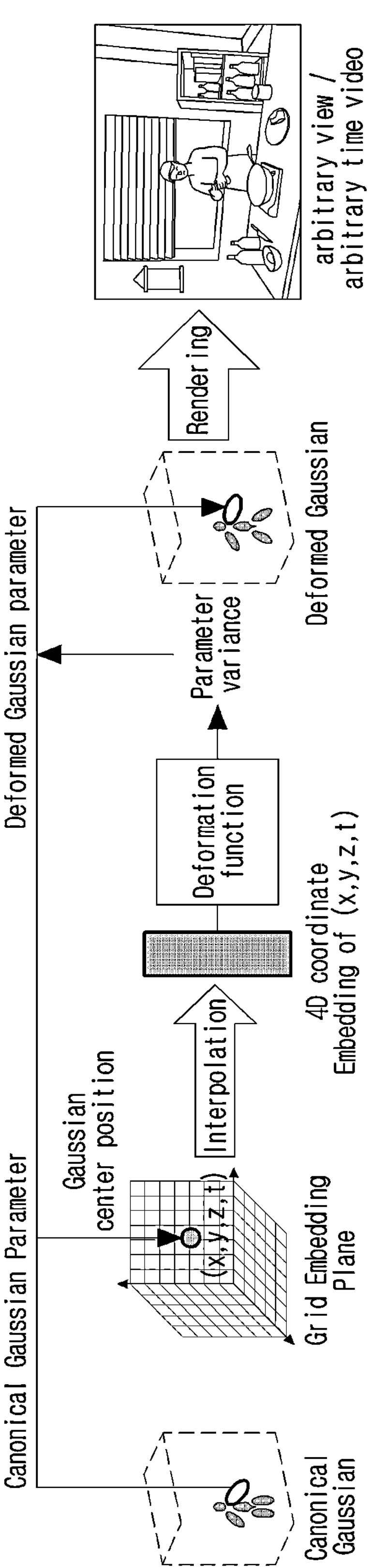
FIG. 4 illustrates an operation based on the 4DGS model that may be applied to this disclosure.

FIG. 4 illustrates an operation based on the 4DGS model that may be applied to this disclosure.

Referring to FIG. 4, the 4DGS model consists of a canonical Gaussian and a deformation function, and it may be based on applying the Gaussian parameters output by the deformation function to a canonical Gaussian and then performing perspective projection.

The deformation function may be a 4-dimensional deformation fields combining 2-dimensional grid embedding planes, and output Gaussian parameters may be Gaussian center position, opacity, rotation, scale, and color.

In the case of a method based on the aforementioned neural radiance fields model, K-Planes model, MixVoxels model, and 4DGS model, that is, a dynamic neural radiance fields model that receives the aforementioned existing multi-view videos as input, separate processing for time synchronization is required.

In other words, the existing dynamic neural radiance fields assume that the times of the given multi-view videos are synchronized. However, videos shot in everyday life rather than in a laboratory environment are not time-synchronized even if they film the same scene.

In this regard, a method of utilizing audio peaks for time synchronization may be applied. For a method using audio peaks, audio is required, and the disadvantage is that accurate synchronization is difficult when background noise and/or noise is included.

If time synchronization as described above is not achieved, the performance of the dynamic neural radiance fields model that receives existing multi-view videos as input may deteriorate. Specifically, if the timestamps for each camera representing a scene are inconsistent, that is, not synchronized, the performance of the dynamic neural radiance fields model deteriorates.

Figure 5:
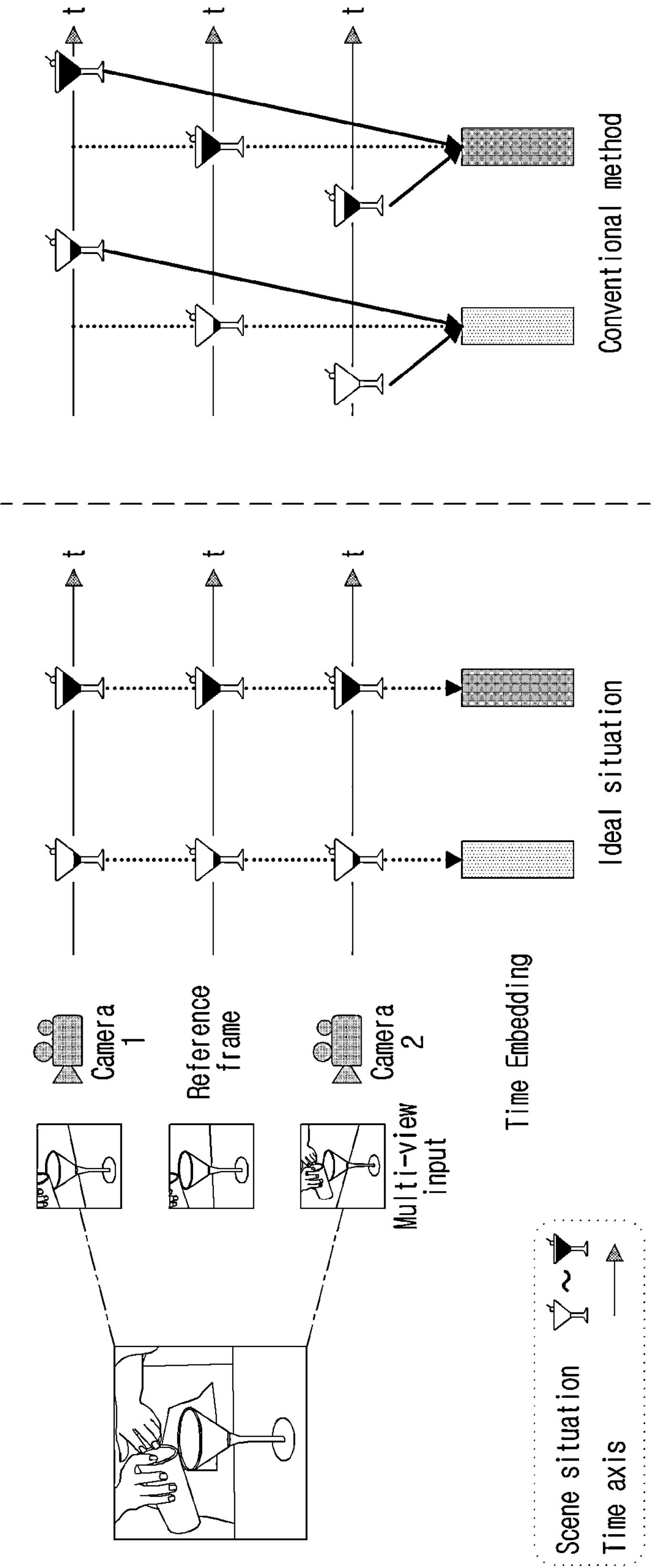
FIG. 5 illustrates time embedding depending on whether each camera representing one scene is time synchronized.

FIG. 5 illustrates time embedding depending on whether each camera representing one scene is time synchronized.

Referring to FIG. 5, an ideal situation may mean that the timestamps for each camera are synchronized. That is, in this case, each time embedding may be used equally for a time synchronized reference frame, a frame captured by Camera 1, and a frame captured by Camera 2.

In contrast, in the existing method, that is, even when the timestamps for each camera is not synchronized, if all cameras have the same frame, the reference frame, the frame captured by Camera 1, and the frame captured by Camera 2 may use the same time embedding. In this case, performance may deteriorate because the same time embedding is used even when the timestamps for each camera is different.

As described above, in order to solve the problem of performance degradation due to frame time inconsistency for each camera, the present disclosure specifically proposes a method of synchronizing the timestamps of cameras by learning the time offset from each camera and applying it.

In this regard, a method of defining a time offset for each camera and configuring the dynamic neural radiance fields to receive this as input may be considered. Here, the time offset is a learnable parameter and is learned from the objective function of the existing dynamic neural radiance fields. A function may be added to the existing dynamic neural radiance fields, which has an embedding at each discrete time, and outputs an embedding by taking continuous time including an offset as input, and only offsets may be added to existing dynamic neural radiance fields with continuous time embeddings.

Hereinafter, for clarity of explanation, with respect to the above-described camera, the proposed method by expressing "camera" in terms of the more general term "view" is described in the present disclosure. In other words, the frame for each camera representing one scene described above may correspond to a frame for each view representing one scene.

Figure 6:
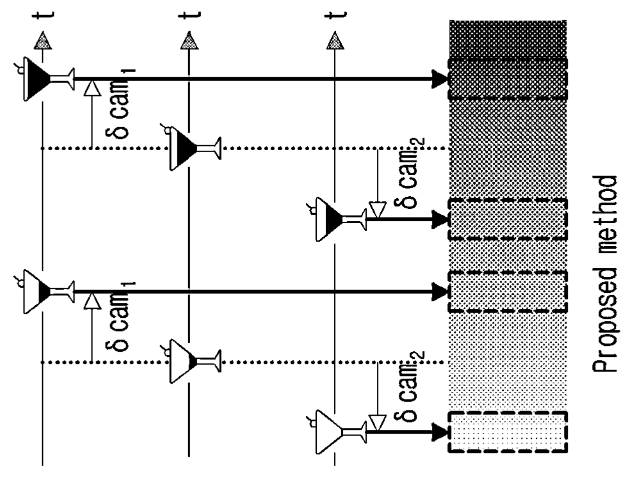
FIG. 6 illustrates a method of applying a time offset for each view according to an embodiment of the present disclosure.

FIG. 6 illustrates a method of applying a time offset for each view according to an embodiment of the present disclosure.

Referring to FIG. 6, unlike the existing method, in the case of the method proposed in the present disclosure, for time synchronization between frames, different time offset values may be applied for each view.

In this regard, the time offset is a learnable parameter and may have different values for each view. The time offset may serve to perform time synchronization by applying it to the time that is the input of the dynamic neural radiance fields model.

For example, if the time offset for view 1 is expressed as $\delta_{view\_1}$, For the frame by view 1, based on the view of the reference frame, time embedding at the view when $\delta_{view\_1}$ is applied, that is, time embedding corrected by $\delta_{view\_1}$ may be used. Additionally, when the time offset for view 2 is expressed as $\delta_{view\_2}$, for the frame by view 2, based on the view of the reference frame, the time embedding at the view where $\delta_{view\_2}$ is applied, that is, the time embedding corrected by $\delta_{view\_2}$, may be used.

Since the timestamps for each view is synchronized when learning and utilizing the time offset proposed in the present disclosure by optimizing it for a 4-dimensional scene, improved performance may be achieved even for out-of-sync video (i.e., out-of-sync input video).

Hereinafter, the time offset learning method proposed in the present disclosure will be described in detail.

For example, the time offset may be learned based on an existing dynamic neural radiance fields objective function. The learning may be performed in the direction of reducing the error between the rendered image through learning and a ground-truth image.

As described above, the time offset may be added to the time at which the dynamic neural radiance fields is input so that time out of synchronization may be corrected, and time embeddings may be obtained by using the corrected time as a new input of the dynamic neural radiance fields.

Equation 1 below is an equation representing time embedding based on time corrected by time offset.

$$F_\theta: (x, d, t_{view\_i}) \rightarrow (c, \sigma), \text{ where } t_{view\_i} = t + \delta_{view\_i} \quad \text{[Equation 1]}$$

In Equation 1, $\delta_{view\_i}$ may mean the time offset of the $i^{th}$ view, x may mean the position (x, y, z) of a point of a ray in 3-dimensional space, and d may mean the viewing angle ($\theta$, $\phi$) toward the point. Additionally, c may mean color, which is the output of the neural network, and $\sigma$ may mean density, which is the output of the neural network. $F_\theta$ may mean a continuous function that represents the color and the density of a 4-dimensional space using x, d, and $t_{view\_i}$ as input.

Equation 2 below is a deformation function equation of the Gaussian splatting-based dynamic neural radiance fields that represents time embedding based on time corrected by time offset.

$$F_\theta: (x, d, t_{view\_i}) \rightarrow (\Delta x, \Delta\sigma, \Delta r, \Delta s, \Delta c), \text{ where } t_{view\_i} = t + \delta_{view\_i} \quad \text{[Equation 2]}$$

In Equation 2, x may mean the center position (x, y, z) of the canonical Gaussian, and d may mean the viewing angle ($\theta$, $\phi$) toward the center. In addition, $\sigma$ may mean the opacity of the Gaussian, r may mean the 3-dimensional rotation of the Gaussian, s may mean the scale of each axis of the Gaussian, and c may mean the color of the Gaussian. $\Delta$ may mean the amount of change in the parameters of each canonical Gaussian. $F_\theta$ may mean a continuous function that represents the amount of change (i.e., variance) in canonical Gaussian parameters using x, d, and $t_{view\_i}$ as input.

The time offset proposed in the present disclosure may correspond to a learnable parameter. At this time, in relation to learning of the time offset, a loss function that minimizes l1 norm of the time offset may be added, assuming that it is zero-centered.

Additionally, a time offset in models with embeddings every discrete time (e.g., the K-Planes model described above) and time offsets in models with embeddings every continuous time (e.g., the MixVoxels model described above) may be considered as the time offset proposed in the present disclosure.

Figure 7:
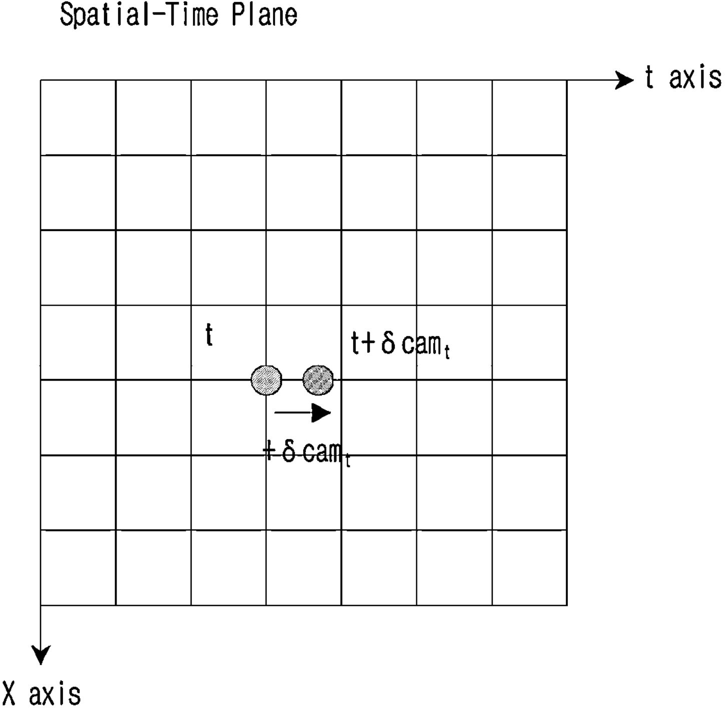
FIG. 7 illustrates an example of time offset application according to an embodiment of the present disclosure.

FIG. 7 illustrates an example of time offset application according to an embodiment of the present disclosure.

Referring to FIG. 7, with respect to the dynamic neural radiance fields model proposed in the present disclosure, a time offset in a model with embeddings at discrete times (e.g., the K-Planes model described above) may be applied.

For example, the time corrected based on the time offset for the corresponding view may be used as an input to the spatial-time plane, instead of the original time (e.g., the time of the reference frame). Based on this, corrected time embeddings may be obtained, and the corrected time embeddings may be used as input to the dynamic neural radiance fields.

In this regard, the time plane may be normalized to [−0.8, 0.8], instead of the existing [−1, 1]. This may be to prevent the corrected time from going out of the spatial-time plane.

Additionally, the corresponding time offset may be learned at 0.1 times the learning rate of the existing neural radiance fields model.

Figure 8:
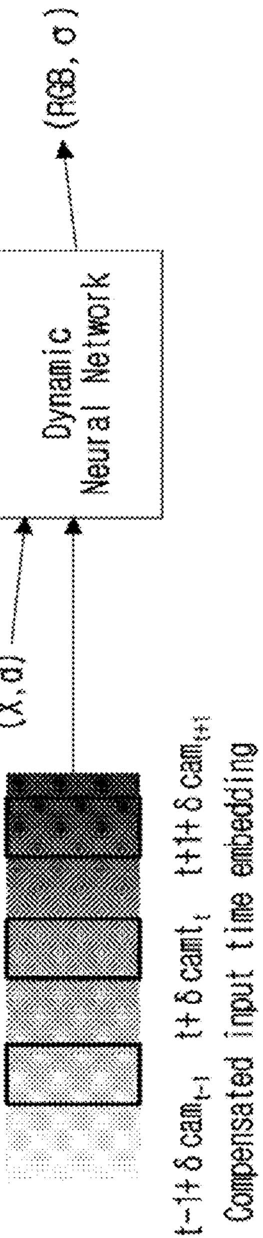
FIG. 8 illustrates another example of time offset application according to an embodiment of the present disclosure.

FIG. 8 illustrates another example of time offset application according to an embodiment of the present disclosure.

Referring to FIG. 8, with respect to the dynamic neural radiance fields model proposed in the present disclosure, a time offset in a model with embeddings for each continuous time (e.g., the MixVoxels model described above) may be applied.

For example, a (dynamic) neural network that outputs temporal embeddings may be added, and a time corrected based on a time offset for the corresponding view may be used as an input to the corresponding neural network, instead of the original time (e.g., the time of the reference frame). That is, the corrected time embedding may be used as an input to the dynamic neural radiance fields.

In this regard, the neural network that outputs the time embedding may be composed of a fully connected neural network of two layers. The neural network may be learned at 5 times the learning rate of the existing neural radiance fields model.

At this time, the corresponding time offset may be learned at 0.5 times the learning rate of the existing neural radiance fields model.

Figure 9:
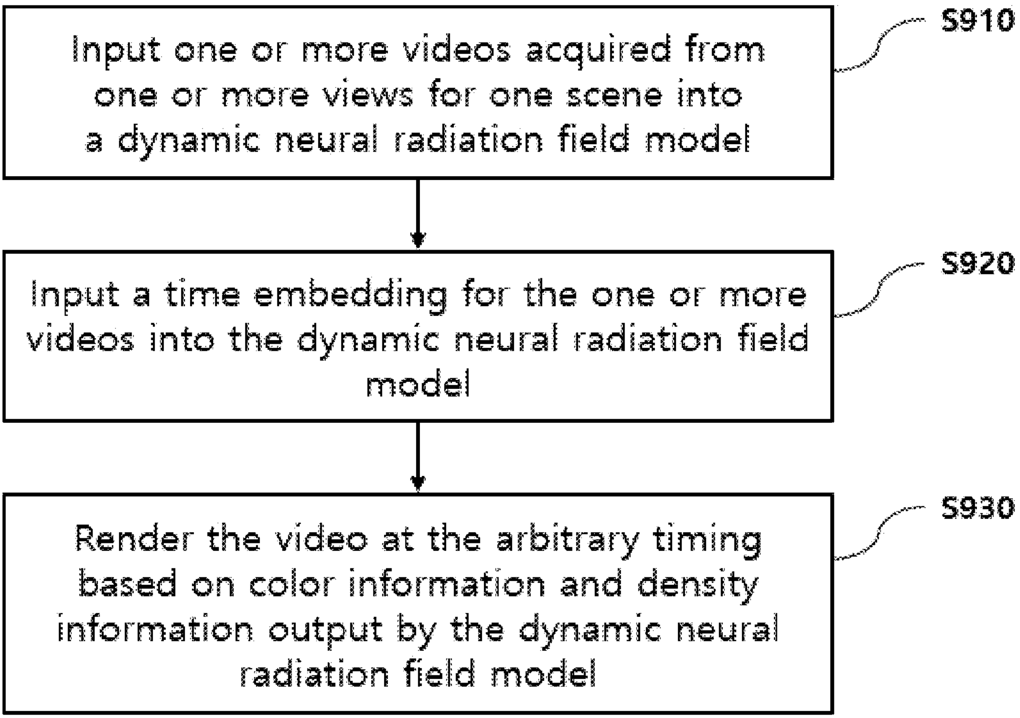
FIG. 9 illustrates an operation flowchart of a method for acquiring a video at an arbitrary view based on a dynamic neural radiance fields model according to an embodiment of the present disclosure.

FIG. 9 illustrates an operation flowchart of a method for acquiring a video at an arbitrary viewpoint based on a dynamic neural radiance fields model according to an embodiment of the present disclosure.

The operation described in FIG. 9 may be based on the dynamic neural radiance fields model and time offset described in FIGS. 1 to 8 of the present disclosure.

Referring to FIG. 9, one or more videos acquired from one or more views for one scene may be input into the dynamic neural radiance fields model (S910).

In this regard, each of the one or more videos may correspond to a 3-dimensional video based on 3-dimensional coordinates.

Additionally, time embedding of the one or more videos may be input to the dynamic neural radiance fields model (S920).

Afterwards, the video at the arbitrary viewpoint may be rendered based on the color information and density information output by the dynamic neural radiance fields model (S930).

In this regard, for the one or more views, time synchronization related to the time embedding may be performed by applying an individual time offset learned for each view.

For example, the time offset may correspond to a learnable parameter. In this regard, the time offset may be learned repeatedly in terms of reducing the error between the rendered image at the arbitrary viewpoint and the ground-truth image.

For example, the time offset may be applied based on the time of a reference video for the one scene.

For example, if the dynamic neural radiance fields model is a model with embeddings at discrete times, for the time embedding, time corrected using the time offset may be used as input to the spatial-time plane. In this regard, for the dynamic neural radiance fields model, the time plane is normalized to [−a, a], where a may be a value greater than 0 and less than 1 (e.g., a is 0.8).

For example, if the dynamic neural radiance fields model is a model with embeddings for each continuous time, the dynamic neural radiance fields model may additionally include a specific neural network that outputs a corrected time embedding based on the time offset. In this regard, the specific neural network may consist of a fully connected neural network based on two layers.

Figure 10:
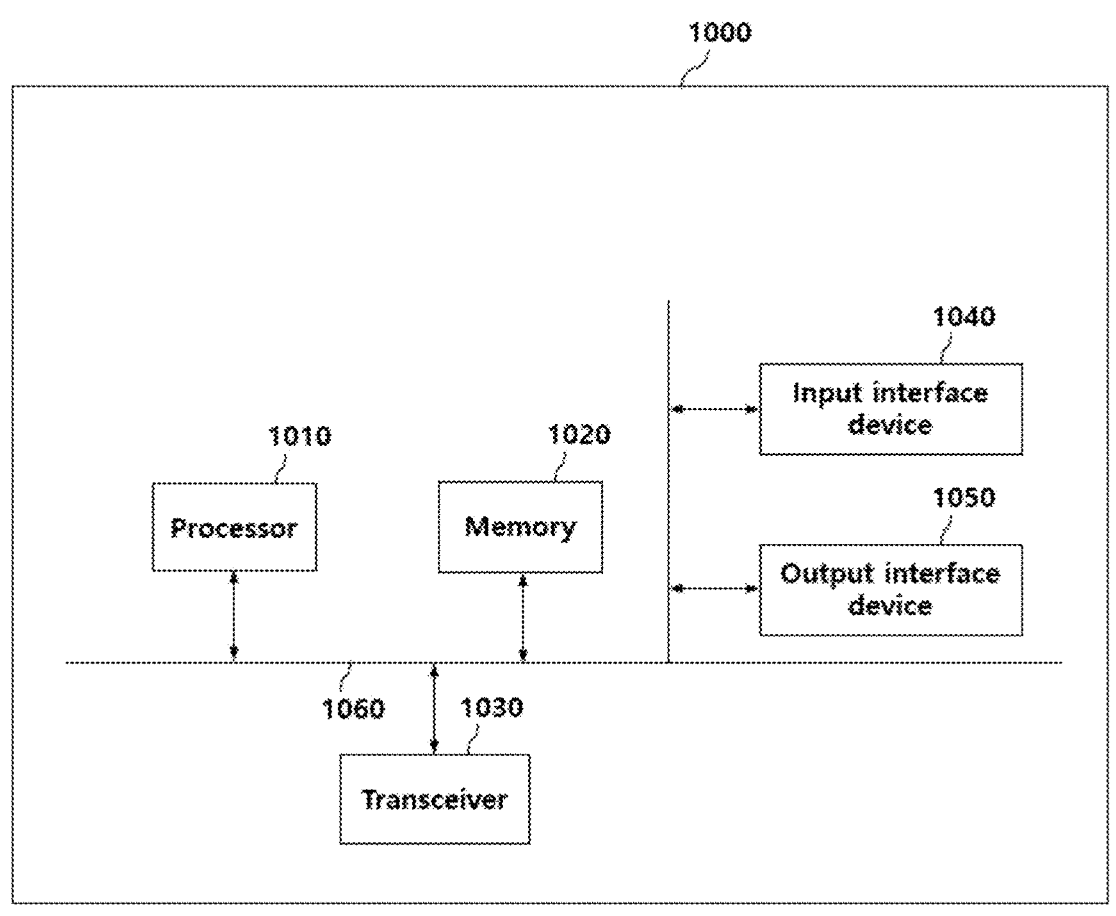
FIG. 10 is a block diagram illustrating a device according to an embodiment of the present disclosure.

FIG. 10 is a block diagram illustrating an apparatus according to an embodiment of the present disclosure.

Referring to FIG. 10, device 1000 may represent a device that implements a method of applying a time offset for each view when representing/acquiring an image at an arbitrary view based on the dynamic neural radiance fields model described in the present disclosure.

The device 1000 may include at least one of a processor 1010, a memory 1020, a transceiver 1030, an input interface device 1040, and an output interface device 1050. Each of the components may be connected by a common bus 1060 to communicate with each other. In addition, each of the components may be connected through a separate interface or a separate bus centering on the processor 1010 instead of the common bus 1060.

The processor 1010 may be implemented in various types such as an application processor (AP), a central processing unit (CPU), a graphic processing unit (GPU), etc., and may be any semiconductor device that executes a command stored in the memory 1020. The processor 1010 may execute a program command stored in the memory 1020. The processor 1010 may be configured to implement the method and device for applying time offset for each viewpoint when expressing/acquiring images at arbitrary viewpoints based on a dynamic neural radiance fields model described based on FIGS. 1 to 9 described above.

And/or, the processor 1010 may store a program command for implementing at least one function for the corresponding modules in the memory 1020 and may control the operation described based on FIGS. 1 to 9 to be performed.

The memory 1020 may include various types of volatile or non-volatile storage media. For example, the memory 1020 may include read-only memory (ROM) and random access memory (RAM). In an embodiment of the present disclosure, the memory 1020 may be located inside or outside the processor 1010, and the memory 1020 may be connected to the processor 1010 through various known means.

The transceiver 1030 may perform a function of transmitting and receiving data processed/to be processed by the processor 1010 with an external device and/or an external system.

The input interface device 1040 is configured to provide data to the processor 1010.

The output interface device 1050 is configured to output data from the processor 1010.

According to the present disclosure, a method and device for synchronizing time while learning a neural radiance fields may be provided without separate preprocessing for time synchronization.

The dynamic neural radiance fields model using existing multi-view videos has poor performance when the times of the videos are not synchronized, but, according to the present disclosure, there is a technical effect of automatically correcting the time of a video that is not synchronized through time offset and ensuring the performance of a dynamic neural radiance fields.

The components described in the example embodiments may be implemented by hardware components including, for example, at least one digital signal processor (DSP), a processor, a controller, an application-specific integrated circuit (ASIC), a programmable logic element, such as an FPGA, GPU other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, it is intended that this disclosure embrace all other substitutions, modifications and variations belong within the scope of the following claims.

What is claimed is:

1. A method of acquiring a video at an arbitrary viewpoint based on a dynamic neural radiance fields model, the method comprising:

inputting one or more videos acquired from one or more views for one scene into the dynamic neural radiance fields model;

inputting a time embedding for the one or more videos into the dynamic neural radiance fields model; and rendering the one or more videos at the arbitrary viewpoint based on color information and density information output by the dynamic neural radiance fields model, wherein time synchronization related to the time embedding is performed by applying an individual time offset learned for each view, for the one or more views.

2. The method of claim 1, wherein the time offset corresponds to a learnable parameter.

3. The method of claim 2, wherein the time offset is repeatedly learned to reduce an error between the rendered one or more videos and ground-truth image.

4. The method of claim 1, wherein the time offset is applied based on a time of a reference video for the one scene.

5. The method of claim 1, wherein, in a case that the dynamic neural radiance fields model is a model with embeddings at discrete times, the time corrected using the time offset is used as an input to a spatial-time plane, for the time embedding.

6. The method of claim 5, wherein, the spatial-time plane is normalized to [−a, a] for the dynamic neural radiance fields model, and wherein a is a value greater than 0 and less than 1.

7. The method of claim 1, wherein, in a case that the dynamic neural radiance fields model is a model with embeddings for each continuous time, the dynamic neural radiance fields model further includes a specific neural network that outputs a corrected time embedding based on the time offset.

8. The method of claim 7, wherein the specific neural network includes a fully connected neural network based on two layers.

9. The method of claim 1, wherein each of the one or more videos corresponds to a 3-dimensional video based on 3-dimensional coordinates.

10. An apparatus of acquiring a video at an arbitrary viewpoint based on a dynamic neural radiance fields model, the apparatus comprising:

at least one processor and at least one memory, wherein the at least one processor is configured to:

input one or more videos acquired from one or more views for one scene into the dynamic neural radiance fields model;

input a time embedding for the one or more videos into the dynamic neural radiance fields model; and render the one or more videos at the arbitrary viewpoint based on color information and density information output by the dynamic neural radiance fields model, wherein time synchronization related to the time embedding is performed by applying an individual time offset learned for each view, for the one or more views.

11. The apparatus of claim 10, wherein the time offset corresponds to a learnable parameter.

12. The apparatus of claim 11, wherein the time offset is repeatedly learned to reduce an error between the rendered one or more videos and ground-truth image.

13. The apparatus of claim 10, wherein the time offset is applied based on a time of a reference video for the one scene.

14. The apparatus of claim 10, wherein, in a case that the dynamic neural radiance fields model is a model with embeddings at discrete times, the time corrected using the time offset is used as the input to the spatial-time plane, for the time embedding.

15. The apparatus of claim 14, wherein, the spatial-time plane is normalized to [−a, a] for the dynamic neural radiance fields model, and wherein a is a value greater than 0 and less than 1.

16. The apparatus of claim 10, wherein, in a case that the dynamic neural radiance fields model is a model with embeddings for each continuous time, the dynamic neural radiance fields model further includes a specific neural network that outputs a corrected time embedding based on the time offset.

17. The apparatus of claim 16, wherein the specific neural network includes a fully connected neural network based on two layers.

18. The apparatus of claim 10, wherein each of the one or more videos corresponds to a 3-dimensional video based on 3-dimensional coordinates.

19. One or more non-transitory computer readable medium storing one or more instructions, wherein the one or more instructions are executed by one or more processors and control an apparatus for acquiring a video at an arbitrary viewpoint based on a dynamic neural radiance fields model to:

input one or more videos acquired from one or more views for one scene into the dynamic neural radiance fields model;

input a time embedding for the one or more videos into the dynamic neural radiance fields model; and render the one or more videos at the arbitrary viewpoint based on color information and density information output by the dynamic neural radiance fields model, wherein time synchronization related to the time embedding is performed by applying an individual time offset learned for each view, for the one or more views.

20. The computer readable medium of claim 19, wherein the time offset corresponds to a learnable parameter.

* * * * *